Nov. 21, 1950 — W. DIETZ — 2,531,114
ANTITARNISH COMPOSITION
Filed Aug. 3, 1949
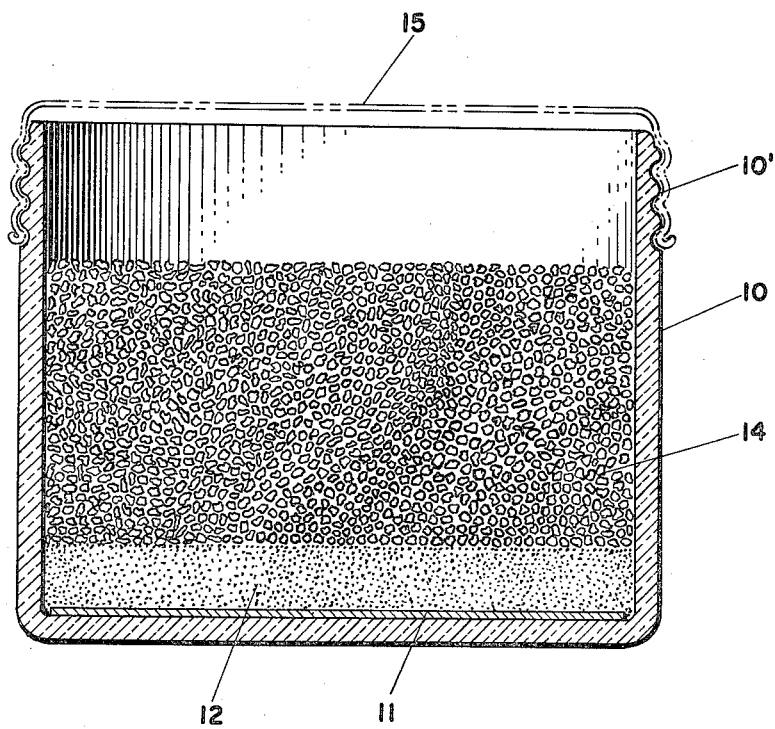
INVENTOR.
WALDEMAR DIETZ
BY Joseph Roesman
ATTORNEY Patented Nov. 21, 1950

2,531,114

UNITED STATES PATENT OFFICE 2,531,114

ANTITARNISH COMPOSITION

Waldemar Dietz, Little Neck, N. Y., assignor to Beam Products, Inc., Long Island City, N. Y., a corporation of New Jersey Application August 3, 1949, Serial No. 108,361

8 Claims. (Cl. 21—2.5)

This invention relates to a composition and article of manufacture for preventing the tarnishing of metals. More specifically, the invention relates to a container having a number of active components arranged therein which function to prevent the tarnishing of silver, iron and other metals, by purifying the ambient air adjacent polished silverware and other polished metal surfaces.

In order to retard or inhibit tarnishing of metals, such as silverware, two definite functions must be performed. First, one must reduce humidity (moisture in the air) because it is the water in the air which is the carrier of air contaminants which tend to hasten oxidation or corrosion of metal surfaces such as silver. Silica gel serves that function. Second, small amounts of freshly liberated oxygen (oxygen in nascent form generated from perborate of soda) tends to readily combine with any free acid fumes to combine into radicles which are in turn absorbed by the moisture (water) in the air.

It is an object of my invention to liberate as slowly as possible the oxygen from perborate of soda. The quantities of oxygen required are extremely small. In the construction of the formulation as packaged in accordance with my invention I have imposed over a given amount of perborate of soda a layer of silica gel. This gel captures the greater portion of the free moisture whereas the moisture not absorbed on the surface of the gel penetrates to the perborate and reacts in the direct proportions of water (water plus any acids present) in a simple chemical reaction, thereby liberating a small amount of oxygen in the reaction obtained.

Additional thereto, I have found that this construction of the formulation gives a more satisfactory result if a layer of organic material, such as a piece of filter paper, is present.

Further details and advantages of the invention will be apparent from the following specification and appended drawing.

Referring to the drawing, I provide a suitable container, such as a glass jar 10 which is threaded at 10' adjacent its open end. I may use a glass jar say 2 inches in diameter and depth having a screw metal cover 15. A disc 11 of porous paper, such as ordinary filter paper, is placed on the bottom of the jar. A layer 12 of powdered perborate of soda is then placed on the paper disc to a depth of about ¼ inch. A layer of granulated silica gel 14 is then placed over the lower layer of perborate of soda to a depth of about 1⅛ inches. I prefer to use a comminuted silica gel of about 8 to about 20 mesh. The cover 15 is then tightly applied to seal the jar.

In use, the cover is removed and the jar is placed in a showcase, cabinet or other enclosure where silverware or other polished metal articles are kept. The aforedescribed components in the jar serve to purify the atmosphere in the cabinet or showcase by absorbing oxidizing gases therein, such as hydrogen sulfide, sulfur dioxide or other gases or substances suspended in the ambient air adjacent the silverware so as to prevent tarnishing of the metal objects.

The size of the jar used may be varied depending upon the size of the cabinet or showcase in which the silverware is placed which it is desired to protect against tarnishing. I prefer to maintain the perborate of soda and silica gel in separate layers, but this is not essential because these two agents may be mixed together in proportions ranging from about 20 to 35% by weight of powdered perborate of soda and about 80 to 65% by weight of comminuted silica gel. I prefer to use about 1 part by weight of perborate of soda and about 3 parts by weight of granulated silica gel of particle size from about 8 to 20 mesh.

The function of the silica gel is to serve as a dehydrating component for efficiently and economically withdrawing moisture (water) from the ambient atmosphere adjacent the polished silver or metal surfaces to be protected against tarnishing. The function of the perborate of soda is to serve as the oxygen liberating component to provide oxygen for combining with any free acid contaminants in the air by the formation of hydroxyl radicals which react as acids. Such acid content in the air is dissolved in the moisture present in the air which in turn is captured by the silica gel. The silica gel is in granular form, as previously explained, so that the particles touching each other produce a capillary action which permits moisture from the silica gel to come into contact with the oxygen liberating component. The direct action of water on perborate of soda produces hydrogen peroxide which at normal temperatures liberates free oxygen because it is not a stable compound.

My composition thus functions through a dual operation, one, absorption from the air of acid radicals including the sulphur series, and second, conversion of such absorbed gases into chemical compounds by reason of combining with component elements present in the formula. The rate of such absorption and subsequent combination or conversion of absorbed radicals is dependent upon conditions of temperature (heat) humidity (moisture) and also on the amount of acid radicals present in the air. The constantly changing conditions of the above three factors preclude any reasonably accurate estimate of how long any given quantity of my composition would be effective. In cooler weather it obviously would be higher than in warm weather because coal and oil, both used as heating fuel, contain appreciable amounts of sulphur. Practical test applications under varying conditions would be the only reliable method for evaluating the life of any given amount of formulations.

Having now described my invention, I claim:

1. An article of manufacture for purifying the ambient atmosphere adjacent metal articles to prevent tarnishing of same comprising a container having a layer of comminuted perborate of soda in proportion of from about 20 to about 35% by weight and a layer of silica gel in proportion of from about 80 to about 65% by weight superimposed on said layer of perborate of soda.

2. An article of manufacture for purifying the ambient atmosphere adjacent silver articles to prevent tarnishing of same comprising a container having a layer of comminuted perborate of soda in proportion of from about 20 to about 35% by weight and a layer of silica gel in proportion of from about 80 to about 65% by weight superimposed on said layer of perborate of soda.

3. An article of manufacture for purifying the ambient atmosphere adjacent metal articles to prevent tarnishing of same comprising a container having a layer of powdered perborate of soda in proportion of from about 20 to about 35% by weight and a layer of silica gel in particle size from about 8 to 20 mesh in proportion of from about 80 to about 65% by weight superimposed on said layer of perborate of soda.

4. An article of manufacture for purifying the ambient atmosphere adjacent silver articles to prevent tarnishing of same comprising a container having a layer of powdered perborate of soda in proportion of from about 20 to about 35% by weight and a layer of silica gel in particle size from about 8 to 20 mesh in proportion of from about 80 to about 65% by weight superimposed on said layer of perborate of soda.

5. An article of manufacture for purifying the ambient atmosphere adjacent silver articles to prevent tarnishing of same comprising a container having a layer of about ¼ inch in depth of comminuted perborate of soda in proportion of from about 20 to about 35% by weight and a layer of about 1⅛ inch of silica gel in proportion of from about 80 to about 65% by weight superimposed on said layer of perborate of soda.

6. An article of manufacture for purifying the ambient atmosphere adjacent metal articles to prevent tarnishing of same comprising a container having a layer of paper on the bottom thereof, a layer of comminuted perborate of soda in proportion of from about 20 to about 35% by weight superimposed on said paper and a layer of silica gel in proportion of from about 20 to about 65% by weight superimposed on said layer of perborate of soda.

7. A composition for purifying the ambient air adjacent metal surfaces to prevent tarnishing of same comprising about 1 part by weight of powdered perborate of soda and about 3 parts by weight of comminuted silica gel of a particle size from about 8 to 20 mesh.

8. A composition for purifying the ambient air adjacent metal surfaces to prevent tarnishing of same comprising about 20 to about 35% by weight of powdered perborate of soda and about 80 to about 65% by weight of granulated silica gel.

WALDEMAR DIETZ.

REFERENCES CITED

The following references are of record in the file of this patent:

UNITED STATES PATENTS

| Number | Name | Date |
|---|---|---|
| 1,561,650 | Lasher | Nov. 17, 1925 |
| 2,151,053 | Solberg | Mar. 21, 1939 |
| 2,207,074 | Smith | July 9, 1940 |